US005773112A

United States Patent [19]

Tachikawa et al.

[11] Patent Number: 5,773,112

[45] Date of Patent: Jun. 30, 1998

[54] LABEL WITH A METALLIC LAYER OF CONTROLLED THICKNESS

[75] Inventors: Kohei Tachikawa; Akira Katayama, both of Tokyo, Japan; Toshio Minagawa; Shigenobu Maruoka, both of Woburn, Mass.

[73] Assignee: Lintec Corporation, Tokyo, Japan

[21] Appl. No.: 778,138

[22] Filed: Jan. 2, 1997

[30] Foreign Application Priority Data

Feb. 29, 1996 [JP] Japan .................................... 8-069264

[51] Int. Cl.[6] ........................................................ B32B 7/00

[52] U.S. Cl. ........................... 428/40.1; 283/81; 283/101; 428/40.9; 428/41.1; 428/41.7; 428/41.8; 428/421; 428/344

[58] Field of Search ................................. 428/40.9, 41.1, 428/41.7, 41.8, 421, 344, 40.1; 283/81, 101

[56] References Cited

U.S. PATENT DOCUMENTS

| | | | |
|---|---|---|---|
| 3,692,610 | 9/1972 | Kornstein | 428/40.9 |
| 3,899,621 | 8/1975 | Willdorf | 428/40.9 |
| 4,578,298 | 3/1986 | Nagafuchi | 428/40.9 |
| 5,328,738 | 7/1994 | McKillip | 428/40.9 |
| 5,565,252 | 10/1996 | Finestone | 428/40.9 |

FOREIGN PATENT DOCUMENTS

| | | |
|---|---|---|
| 0 606 699 | 7/1994 | European Pat. Off. . |
| 0 609 683 | 8/1994 | European Pat. Off. . |
| 05-016290 | 1/1993 | Japan . |

*Primary Examiner*—Nasser Ahmad

*Attorney, Agent, or Firm*—Young & Thompson

[57] ABSTRACT

A label with a metallic layer of controlled thickness comprising a transparent or semi-transparent film, a metallic layer which is formed by metal deposition, has a light transmittance of 3 to 70%, and is formed on one side of the film, and a layer of an adhesive material formed on the metallic layer. Alternatively, a protective layer may be formed on the metallic layer, and the layer of an adhesive material formed on the other side of the film. The label is transparent even though it shows metallic gloss, has remarkably beautiful appearance, and is suitable for artistic design.

13 Claims, 1 Drawing Sheet

LABEL WITH A METALLIC LAYER OF CONTROLLED THICKNESS

FIELD OF THE INVENTION

The present invention relates to a novel label characterized by a metallic layer of controlled thickness. More particularly, the present invention relates to a label containing a thin metal layer and showing transparency and reflectivity.

PRIOR ART OF THE INVENTION

As one of decorative processes of molded plastic articles, the so called metallizing process by which a thin layer of a metal is formed on a molded plastic article has heretofore been known. For example, the chemical-electric plating process, the vacuum vapor deposition process, the sputtering process, the ion plating process, the hot stamping process, coating of mixed metal powder, and mixing of metal powder into a material for molding are known. Plastic films coated with a metal layer on the surface by a PVD process (a physical vapor deposition process), such as the vacuum vapor deposition, the sputtering process, and the ion plating process, are used in many applications, such as labels, tapes, gold and silver threads, and films for light shielding or heat insulation. Particularly, films having good gloss, such as rigid polyvinyl chloride films, acetate films, and polyester films of a larger thickness, are coated with aluminum and used for labels and stickers.

However, when a film having a metal layer formed by vapor deposition on the surface is used for a label, the label has drawbacks in that the label is not always satisfactory in view of artistic design because the metal layer formed by vapor deposition is opaque, and that observation of the content of a container is difficult when it is attached to a transparent container.

SUMMARY OF THE INVENTION

The present invention accordingly has an object to provide a label with a metallic layer of controlled thickness which provides remarkably beautiful appearance when the film is printed, is suitable for artistic design because it is transparent even though it shows metallic gloss, and allows easy observation of the content of a container when the film is used as a label on a transparent container.

As the result of extensive investigations undertaken by the present inventors to develop a label with a metallic layer of controlled thickness having the advantageous properties described above, it was discovered that the object can be achieved by a film comprising a transparent or semi-transparent film, a metallic layer which is formed by vapor deposition, has a specific light transmittance, and is laminated on one side of the film, and a layer of an adhesive material laminated on the metallic layer, or by a film comprising a transparent or semitransparent film, a metallic layer which is formed by vapor deposition, has a specific light transmittance, and is laminated on one side of the film, a protective layer laminated on the metallic layer, and a layer of an adhesive material laminated on the other side of the film. The present invention has been completed on the basis of the discovery.

Thus, the present invention provides:

(1) A label with a metallic layer of controlled thickness comprising a transparent or semi-transparent film, a metallic layer which is formed by metal deposition, has a light transmittance of 3 to 70%, and is formed on one side of the film, and a layer of an adhesive material formed on the metallic layer (referred to as label I with a metallic layer of controlled thickness hereinafter); and (2) A label with a metallic layer of controlled thickness comprising a transparent or semi-transparent film, a metallic layer which is formed by metal deposition, has a light transmittance of 3 to 70%, and is formed on one side of the film, a protective layer formed on the metallic layer, and a layer of an adhesive material formed on the other side of the film (referred to as label II with a metallic layer of controlled thickness hereinafter).

The preferred embodiments of the present invention include:

(3) The label with a metallic layer of controlled thickness described in (1), wherein the label additionally comprises a layer of printing in between the transparent or semi-transparent film and the metallic layer, or on the side of the film opposite to the side on which the metallic layer is deposited;

(4) The label with a metallic layer of controlled thickness described in (3), wherein the label additionally comprises a protective layer for printing which is formed on the layer of printing;

(5) The label with a metallic layer of controlled thickness described in (2), wherein the label additionally comprises a layer of printing formed on the protective layer for metal;

(6) The label with a metallic layer of controlled thickness described in (5), wherein the label additionally comprises a protective layer for printing formed on the layer of printing;

(7) The label with a metallic layer of controlled thickness described in any of (1) to (6), wherein the transparent or semi-transparent film is treated with corona discharge or has an under coat on one or both sides thereof; and (8) The label with a metallic layer of controlled thickness described in any of (1) to (7), wherein the metallic layer formed by metal deposition is an aluminum layer.

(9) The label with a metallic layer of controlled thickness described in any of (1) to (8), wherein the label additionally comprises a release liner laminated on the layer of an adhesive material;

Figure 1:
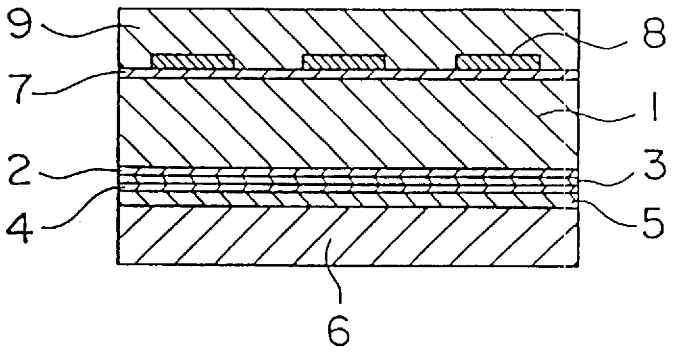
FIG. 1 exhibits a section view showing the construction of an example of the label with a metallic layer of controlled thickness of the present invention.

The numbers and characters in the figures have the meanings as listed in the following:

| | |
|---|---|
| 1 | a substrate film |
| 2 | an under treatment layer |
| 3 | a metallic layer formed by metal deposition |
| 4 | a protective layer |
| 5 | a layer of an adhesive material |
| 6 | a release liner |
| 7 | an ink receiving layer |
| 8 | a layer of printing |

-continued

| | |
|---|---|
| 9 | a protective layer for printing |
| 10 | a protective layer |

DETAILED DESCRIPTION OF THE INVENTION

In the label with a metallic layer of controlled thickness of the present invention, the transparent or semi-transparent film used as the substrate film is not particularly limited. A suitable film for the substrate film can be selected from various types of film, such as cellulose triacetate, cellulose diacetate, cellophane, oriented polypropylene, cast polypropylene, low density polyethylene, polystyrene, polycarbonate, polyvinyl alcohol, polyvinyl chloride, and polyethylene terephthalate. The thickness of the substrate film is generally in the range of 12 to 100 μm. The substrate film may be colored.

In the present invention, for the purpose of increasing adhesion of the substrate film with a metallic layer formed by metal deposition, a layer of printing, a layer of an adhesive material, and other laminated layers, an under treatment layer may be formed on one or both sides of the substrate film by a surface treatment to increase the surface energy, to polarize the surface, or to increase the affinity of the surface. Examples of the process for forming the under treatment layer include (1) a process of oxidation of the surface, (2) a process of forming roughness on the surface, and (3) a process of forming an under coat.

Examples of (1) the process of oxidation of the surface include treatment with corona discharge, treatment with chromic acid (a wet process), treatment with flame, treatment with hot air, exposure to ozone, and irradiation with ultraviolet light. Examples of (2) the process of forming roughness on the surface include sand blasting and treatment with a solvent. The process for forming the under treatment layer can be suitably selected in accordance with the type of the substrate film. In general, the treatment with corona discharge is preferably used because of superior effect and easier operation.

The treatment with corona discharge is the process most widely used for surface treatment of plastic films. This process is, for example, conducted as described in the following. An electrode connected to an apparatus for generating a high voltage and a metal roll covered with a polyester film, a hypalon film, or an EP rubber are disposed at a distance of 0.5 to 0.6 mm to each other. High voltage corona is generated at the gap between the electrode and the metal roll by application of a high voltage of thousands volts to tens of thousands volts with a high frequency of hundreds kilocycles per second. When a substrate film passes through the gap at a constant speed, carbonyl groups and the like are formed on the surface of the substrate film by the reaction with ozone and nitrogen oxides formed by the corona discharge, and the surface of the substrate film is made hydrophilic. The degree of the treatment can be adjusted by the distance of the gap, the voltage, the consumed electricity, the thickness of the material covering the metal roll, and the speed of the substrate film passing through the gap. As the apparatus used for the treatment with corona discharge, an apparatus using an electrode movable to a specified direction in combination with a fixed electrode, an apparatus which treats both sides of a substrate film with corona discharge, or an apparatus which prevents formation of the area not treated with corona discharge by adjusting arrangement of the electrodes, may be used in place of the apparatus having the fixed electrodes.

As (3) the process of forming an under coat, a process in which the surface is coated with an acrylic resin, a polyester resin, a polyurethane resin, or a vinyl acetate resin is generally used. The thickness of the under coat layer is generally about 0.1 to 10 μm. The under coat layer may be colored.

The label I with a metallic layer of controlled thickness of the present invention has the construction comprising a metallic layer which is formed by metal deposition, has a light transmittance of 3 to 70% on the substrate film, and a layer of an adhesive material laminated on the metallic layer, as the essential constituting layers thereof.

The metallic material forming the metallic layer by metal deposition is not particularly limited as long as the material can be used for metal deposition by the PVD process. Examples of the metallic material include metals, such as aluminum, chromium, nickel, titanium, copper, gold, and silver; alloys of metals; and compounds of metals. Among these metallic materials, aluminum is particularly preferable because of superior balance of easiness for metal deposition, economic advantage, and adaptability for artistic design.

Preferable examples of the process for metal deposition include various types of the PVD process, such as the vacuum vapor deposition process, the sputtering process, and the ion plating process. In the vacuum vapor deposition process, for example, a metallic material for forming a layer by metal deposition and a substrate film are placed under a high vacuum. The metallic material is vaporized by heating and attached to the surface of the substrate film by condensation to form a thin layer of the metallic material. In the sputtering process, for example, argon gas of a low pressure is introduced into a chamber of a high vacuum. A metallic material used for forming the metallic layer is placed at the cathode, and glow discharge is generated. The argon ions formed by the glow discharge sputter the metallic material to cause scattering of the metallic material. The scattered metallic material is attached to and accumulated on the surface of the substrate film to form a layer of the metallic material. In the ion plating process, for example, a substrate film is placed on the cathode and a metallic material used for vaporization is placed on the anode. Particles of the vaporized metallic material are ionized while the particles pass through glow discharge. The ionized particles of the metallic material are strongly adsorbed on the surface of the substrate film to form a layer of the metallic material with enhanced adhesion.

In the present invention, it is necessary that the light transmittance of the metallic layer formed by metal deposition be in the range of 3 to 70%. When the light transmittance is less than 3%, the obtained label is inferior in transparency, and the advantageous property for artistic design cannot be obtained. Moreover, observation of the content becomes difficult when the label is used for a transparent container. When the light transmittance is more than 70%, it is difficult to obtain the desired metallic gloss is obtained, and the object of the present invention cannot be achieved. The light transmittance of the metallic layer formed by vapor deposition is particularly preferably in the range of 10 to 60%.

The light transmittance can be controlled by the thickness of the metallic layer formed by metal deposition. The preferable thickness of the metallic layer is different in accordance with the type of the metal constituting the metallic layer and cannot be specified. The thickness is generally selected in the range of 10 to 200 Å.

The light transmittance described above are measured in accordance with the method of Japanese Industrial Standard K 7105.

The label of the present invention has metallic gloss. The light reflection of the metallic gloss is preferably in the range of 20 to 80%, more preferably in the range of 30 to 70%. When the light reflection is less than 20%, the gloss may be inferior. When the light reflection is more than 80%, the transparency may be inferior. The light reflection is measured in accordance with the method of Japanese Industrial Standard K 7105.

In label I with a metallic layer of controlled thickness of the present invention, a layer of an adhesive material is formed on the metallic layer formed by metal deposition. A protective layer may be formed in advance on the metallic layer before the layer of an adhesive material is formed on the metallic layer to protect the metallic layer and to promote the adhesion between the metallic layer and the layer of an adhesive material. For the protective layer, an acrylic resin, a polyester resin, a polyurethane resin, or a vinyl acetate resin is generally used. The thickness of the protective layer is generally about 0.1 to 10 $\mu$m.

The type of the adhesive material used for the layer of an adhesive material is not particularly limited. Any of adhesive materials conventionally used for lables, for example, glues such as vinyl acetate or starch, thermal sensitive adhesives and pressure sensitive adhesives, can be used. The thickness of the layer of an adhesive material is generally in the range of 4 to 50 $\mu$m.

In label I with a metallic layer of controlled thickness of the present invention, a layer of printing is generally formed. The layer of printing may be formed on the side of the substrate film opposite to the side on which the metallic layer is formed. The layer of printing may also be formed between the substrate film and the metallic layer. As the ink used for forming the layer of printing, an ink containing a binder, such as an acrylic resin, a polyester resin, a polyurethane resin, a polyvinyl chloride resin, a vinyl chloride-vinyl acetate copolymer resin, a butyral resin, a nitrocellulose resin, an acetylcellulose resin, and a polystyrene resin; coloring agents, such as pigments and dyestuffs; extender pigments; and solvents; are used. The layer of printing can be formed by using the ink described above in accordance with a conventional printing process, such as the gravure printing process, the screen printing process, the offset printing method, and the flexo printing process.

When the layer of printing is formed on the side of the substrate film opposite to the side on which the metallic layer is formed, the substrate film may be treated on the surface as described above in advance and coated with an ink receiving layer on the treated surface, and the layer of printing may be formed on the ink receiving layer to improve the property for printing. The thickness of the ink receiving layer is generally in the range of 0.1 to 10 $\mu$m. The ink receiving layer may be colored.

In label I with a metallic layer of controlled thickness of the present invention, when the layer of printing is formed on the side of the substrate opposite to the side on which the metallic layer is formed, a protective layer for printing may be formed on the layer of printing. Examples of the protective layer for printing include a layer of an acrylic resin, a layer of a polyurethane resin, and a layer of a resin of an ultraviolet curing type. The thickness of the protective layer for printing is generally in the range of 0.1 to 10 $\mu$m.

In label I with a metallic layer of controlled thickness of the present invention, a hard coat layer or a layer to prevent reflection may also be formed on the side of the substrate film opposite to the side on which the metallic layer is formed.

In label I with a metallic layer of controlled thickness of the present invention, a release liner may be attached to the layer of an adhesive material. Examples of the release liner include materials prepared by coating a releasing agent, such as a silicone resin, on various types of paper, such as glassine paper, coated paper, polyethylene, laminated paper, or on various types of film.

FIG. 1 exhibits a section view showing the construction of an example of label I with a metallic layer of controlled thickness of the present invention. In this construction, an under treatment layer 2, a metallic layer formed by metal deposition 3, a protective layer 4, a layer of an adhesive material 5, and a release liner 6 are formed successively on one side of the substrate film 1. On the other side of the substrate film 1, an ink receiving layer 7, a layer of printing 8, and a protective layer for printing 9 are formed successively.

A layer of printing may be formed between the layer of an adhesive material 5 and the protective layer 4.

Label II with a metallic layer of controlled thickness of the present invention is described in the following.

Label II with a metallic layer of controlled thickness of the present invention has the construction comprising a metallic layer which is formed by metal deposition, has a light transmittance of 3 to 70%, and is formed on one side of the film, a protective layer formed on the metallic layer, and a layer of an adhesive material coated on the other side of the substrate film, as the essential constituting layers thereof.

The metallic material and the process used for forming the metallic layer are the same as those used in label I with a metallic layer of controlled thickness described above. Before the metallic layer is formed by metal deposition, an under coat layer may also be formed on the substrate film in advance in the same manner as that in label I with a metallic layer of controlled thickness.

In label II with a metallic layer of controlled thickness, a protective layer is formed on the metallic layer to protect the metallic layer. For the protective layer, an acrylic resin, a polyester resin, a polyurethane resin, or a vinyl acetate resin is generally used. The thickness of the protective layer is generally about 0.1 to 10 $\mu$m. The protective layer may be colored.

In label II with a metallic layer of controlled thickness, a layer of an adhesive material is formed on the side of the substrate opposite to the side on which the metallic layer is formed. The type and the thickness of the layer of an adhesive material are the same as those of the layer of an adhesive material in label I with a metallic layer of controlled thickness.

In label II with a metallic layer of controlled thickness of the present invention, a layer of printing is generally formed. The layer of printing is preferably formed on the protective layer described above. The ink used for the layer of printing, the process for forming the layer of printing, and the thickness of the layer of printing are the same as those of the layer of printing in label I with a metallic layer of controlled thickness described above. A protective layer for printing may also be formed on the layer of printing in the same manner as that in label I with a metallic layer of controlled thickness.

In label II with a metallic layer of controlled thickness, a release liner may also be attached to the layer of an adhesive material in the same manner as that in label I with a metallic layer of controlled thickness.

Figure 2:
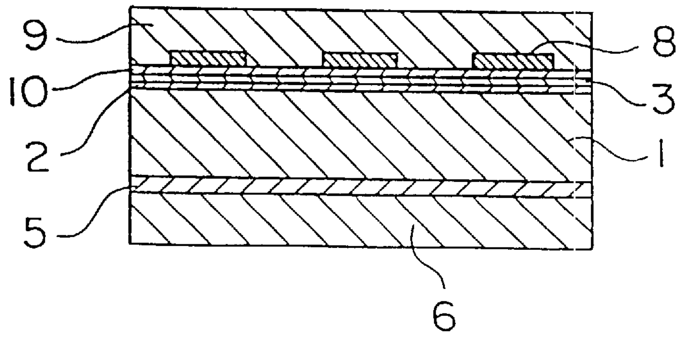
FIG. 2 exhibits a section view showing the construction of another example of the label with a metallic layer of controlled thickness of the present invention.

FIG. 2 exhibits a section view showing the construction of an example of label II with a metallic layer of controlled thickness of the present invention. In this construction, an under treatment layer 2, a metallic layer formed by metal deposition 3, a protective layer 10, a layer of printing 8, and a protective layer for printing 9 are formed successively on one side of a transparent or semi-transparent substrate film 1. On the other side of the substrate film 1, a layer of an adhesive material 5 and a release liner 6 are formed successively.

A layer of printing may be formed between the substrate film 1 and the layer of an adhesive material 5.

To summarize the advantages of the present invention, the label with a metallic layer of controlled thickness of the present invention provides remarkably beautiful appearance when the film is printed, is suitable for artistic design because it is transparent even though it shows metallic gloss, and allows easy observation of the content of a container when the film is used as a label on a transparent container. Thus, the label of the present invention has a very high commercial value.

The present invention is described more specifically with reference to examples in the following.

EXAMPLE 1

A polyester film of 38 μm thickness was treated with corona discharge on one side. Then, aluminum was deposited on the treated surface by using an apparatus for vacuum vapor deposition (a product of Leybold Company; High Vacuum Web Coater) (light transmittance, 60%; light reflection, 25%).

The side of the film opposite to the side on which aluminum was laminated was coated with a polyester resin (a product of Toyobo Co., Ltd.; trade name, Vylon RV200) to the thickness of 0.2 μm (dry) to form an ink receiving layer.

The aluminum layer formed by the metal deposition in the above was coated with a polyester resin (a product of Toyobo Co., Ltd.; trade name, Vylon RV280) in an amount of 0.2 $g/m^2$ (dry) to form a protective layer. The formed protective layer was coated with an acrylic adhesive material (a product of Toyo Ink MFG. Co., Ltd.; trade name, Oribine BPS-5127) to a thickness of 15 μm (dry), and a release liner (a product of Lintec Co., Ltd.; trade name, 8K) was attached to the adhesive layer thus formed.

Printing was made on the ink receiving layer by an offset printer to prepare a label. When this label was attached to a glass bottle, the label was shown to be a novel label having beautiful metallic gloss through which the content of the glass bottle could be observed.

EXAMPLE 2

A biaxially oriented polypropylene film of 50 μm thickness was treated with corona discharge on one side. The treated surface was coated with a polyester resin (a product of Toyobo Co., Ltd.; trade name, Vylon RV200) to a thickness of 0.3 μm (dry) to form an ink receiving layer.

The coated film was treated with corona discharge on the side opposite to the side on which the ink receiving layer was formed. Then, aluminum was laminated on the treated surface by metal deposition by using the apparatus for vacuum vapor deposition (light transmittance, 20%; light reflection, 55%).

The aluminum layer formed in the above was coated with the acrylic adhesive material to a thickness of 15 μm (dry), and a release liner was attached to the adhesive layer thus formed.

Printing was made on the ink receiving layer by an offset printer to prepare a label. When this label was attached to a glass bottle, the label was shown to be a novel label having beautiful metallic gloss through which the content of the glass bottle could be observed.

EXAMPLE 3

A biaxially oriented polypropylene film of 50 μm thickness was treated with corona discharge on one side. The treated surface of the film was coated with a polyester resin (a product of Toyobo Co., Ltd.; trade name, Vylon RV-290) to a thickness of 0.2 μm (dry) to form an under treatment layer. Then, aluminum was laminated on the formed under treatment layer by metal deposition by using the apparatus for vacuum vapor deposition (light transmittance, 10%; light reflection, 65 %).

The aluminum layer formed by metal deposition in the above was coated with a polyester resin (a product of Toyobo Co., Ltd.; trade name, Vylon RV200) to a thickness of 0.3 μm (dry) to form a protective layer.

In accordance with the same procedures as those in Example 2, a layer of the adhesive material was formed on the side of the film opposite to the side on which the aluminum layer was formed, and a release liner was attached to the formed layer of the adhesive material.

Printing was made on the protective layer by an offset printer to prepare a label. When this label was attached to a glass bottle, the label was shown to be a novel label having beautiful metallic gloss through which the content of the glass bottle could be observed.

EXAMPLE 4

The label prepared in Example 2 was coated with an over varnish (a product of T & K TOKA Co., Ltd.; UV1610P Varnish) by using a printer to form a protective layer for printing (2 μm, dry) after characters, marks, and illustrations were printed. When the obtained label was attached to a glass bottle, the label was shown to be a novel label having beautiful metallic gloss through which the content of the glass bottle could be observed. The printed ink was not easily removed even when the label was rubbed.

Comparative Example 1

A label was prepared by metal deposition in accordance with the same procedures as those in Example 1 except that the light transmittance was adjusted to 2% (light reflection, 85%) by suitably adjusting the condition of metal deposition of aluminum.

When this label was attached to a glass bottle, observation of the content was difficult even though metallic gloss was obtained.

Comparative Example 2

A label was prepared by metal deposition in accordance with the same procedures as those in Example 1 except that the light transmittance was adjusted to 90% (light reflection, 10%) by suitably adjusting the condition of metal deposition of aluminum.

When this label was attached to a glass bottle, the label had almost no metallic gloss even though the content could be observed.

What is claimed is:

1. A label comprising:

a transparent or semi-transparent substrate film having a printing layer on one side thereof a print receiving layer between said substrate film and said printing layer;

metallic layer on the other side of said substrate film, said metallic layer having a thickness so as to be 3–70% light transmitting;

a transparent or semi-transparent adhesive layer on a surface of said metallic film opposite said substrate film;

a release liner on a surface of said adhesive layer opposite said metallic film and the formed label has metallic gloss with light reflection in the range of 20 to 80 percent.

2. The label of claim 1, further comprising a transparent or semi-transparent printing protective layer on said one side of said substrate film atop said printing layer.

3. The label of claim 1, further comprising a protective layer between said metallic layer and said adhesive layer.

4. A transparent or semi-transparent label affixed to a transparent or semi-transparent portion of a container, said label comprising:

a substrate film having a printing layer on one side thereof a print receiving layer between said substrate film and said printing layer;

a metallic layer on the other side of said substrate film, said metallic layer having a thickness so as to be 3–70% light transmitting;

an adhesive layer on a surface of said metallic film opposite said substrate film, said adhesive layer adhering to said portion of said container and the formed label has metallic gloss with light reflection in the range of 20 to 80 percent.

5. The label and container of claim 4, further comprising a printing protective layer on said one side of said substrate film atop said printing layer.

6. The label and container of claim 4, further comprising a protective layer between said metallic layer and said adhesive layer.

7. A label comprising:

a transparent or semi-transparent substrate film;

a transparent or semi-transparent adhesive layer on one side of said substrate film;

a release liner on a surface of said adhesive layer opposite said substrate film;

a metallic layer on the other side of said substrate film, said metallic layer having a thickness so as to be 3–70% light transmitting;

a printing layer on a first surface of said metallic layer opposite said substrate film and the formed label has metallic gloss with light reflection in the range of 20 to 80 percent.

8. The label of claim 7, further comprising a transparent or semi-transparent printing protective layer on said first surface of said metallic film atop said printing layer.

9. The label of claim 7, further comprising a protective layer between said metallic layer and said printing layer.

10. A transparent or semi-transparent label affixed to a container having a portion that is transparent or semi-transparent, said label comprising:

a substrate film;

an adhesive layer on one side of said substrate film that is adhered to said portion of said container;

a metallic layer on the other side of said substrate film, said metallic layer having a thickness so as to be 3–70% light transmitting;

a printing layer on a first surface of said metallic layer opposite said substrate film and the formed label has metallic gloss with light reflection in the range of 20 to 80 percent.

11. The label and container of claim 10, further comprising a printing protective layer on said first surface of said metallic film atop said printing layer.

12. The label and container of claim 10, further comprising a protective layer between said metallic layer and said printing layer.

13. The label and container of claim 10, further comprising an under treatment between said metallic layer and said substrate film.

* * * * *